June 1, 1965  M. C. CUTLER  3,186,552
FILTER ELEMENT END CAP
Filed Dec. 12, 1962  3 Sheets-Sheet 1
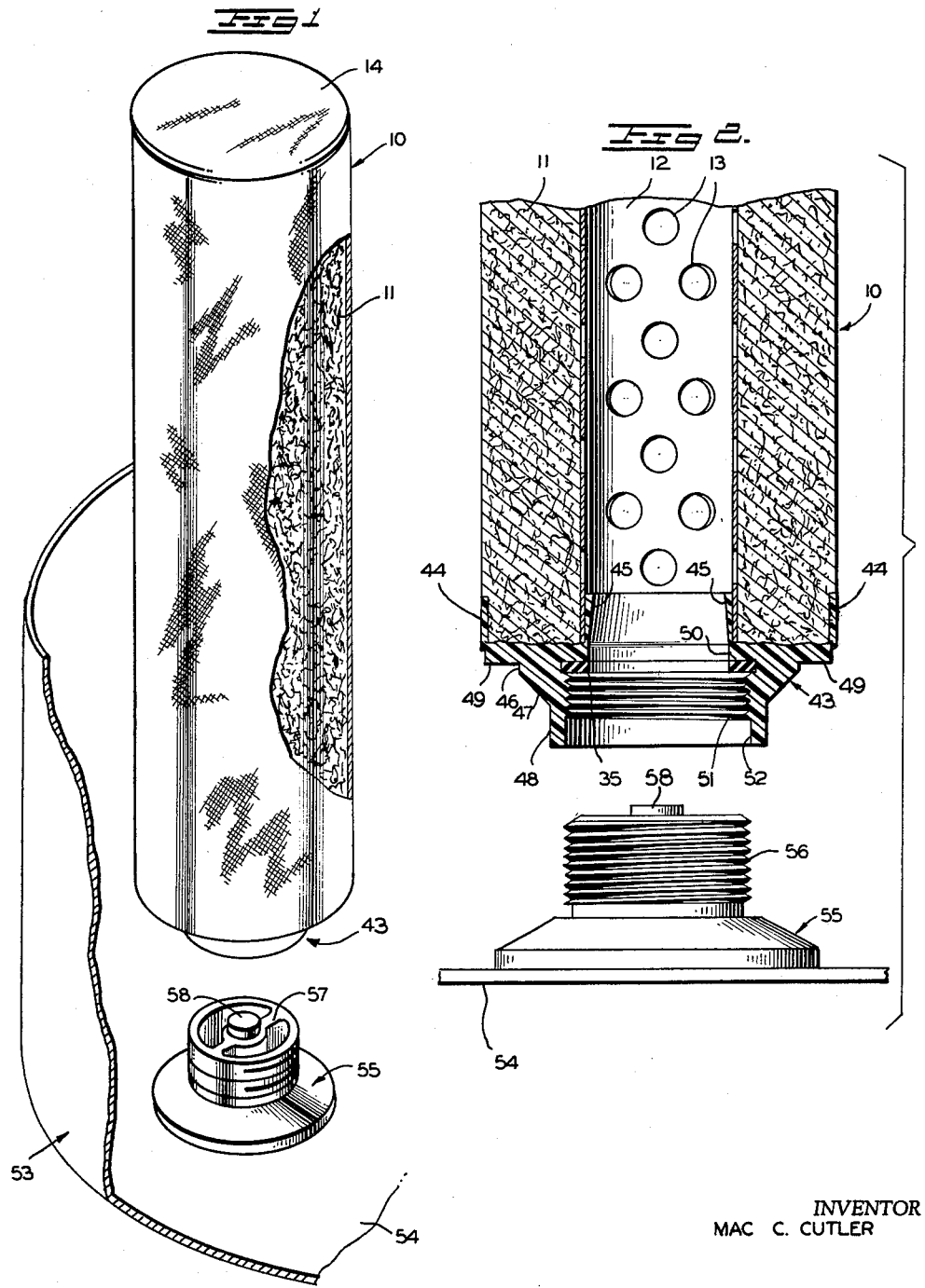
INVENTOR
MAC C. CUTLER
BY *Stowell & Stowell*
ATTORNEYS June 1, 1965   M. C. CUTLER   3,186,552
FILTER ELEMENT END CAP
Filed Dec. 12, 1962   3 Sheets-Sheet 2
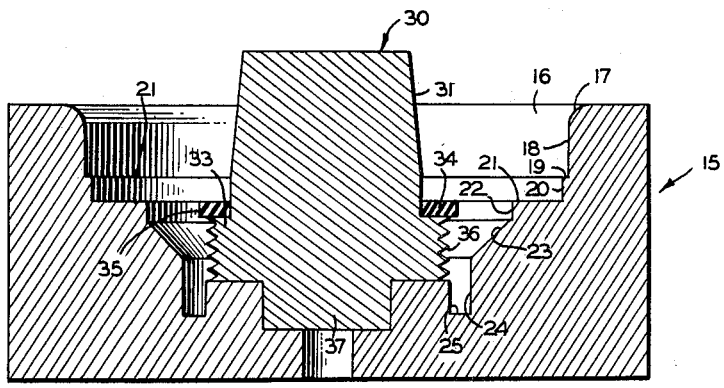
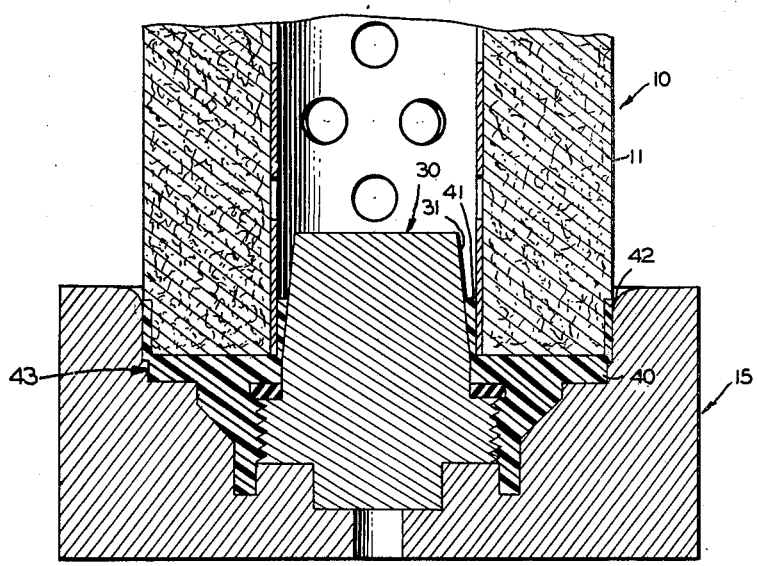
INVENTOR
MAC C. CUTLER
BY *Stowell & Stowell*
ATTORNEYS June 1, 1965 M. C. CUTLER 3,186,552
FILTER ELEMENT END CAP
Filed Dec. 12, 1962 3 Sheets-Sheet 3
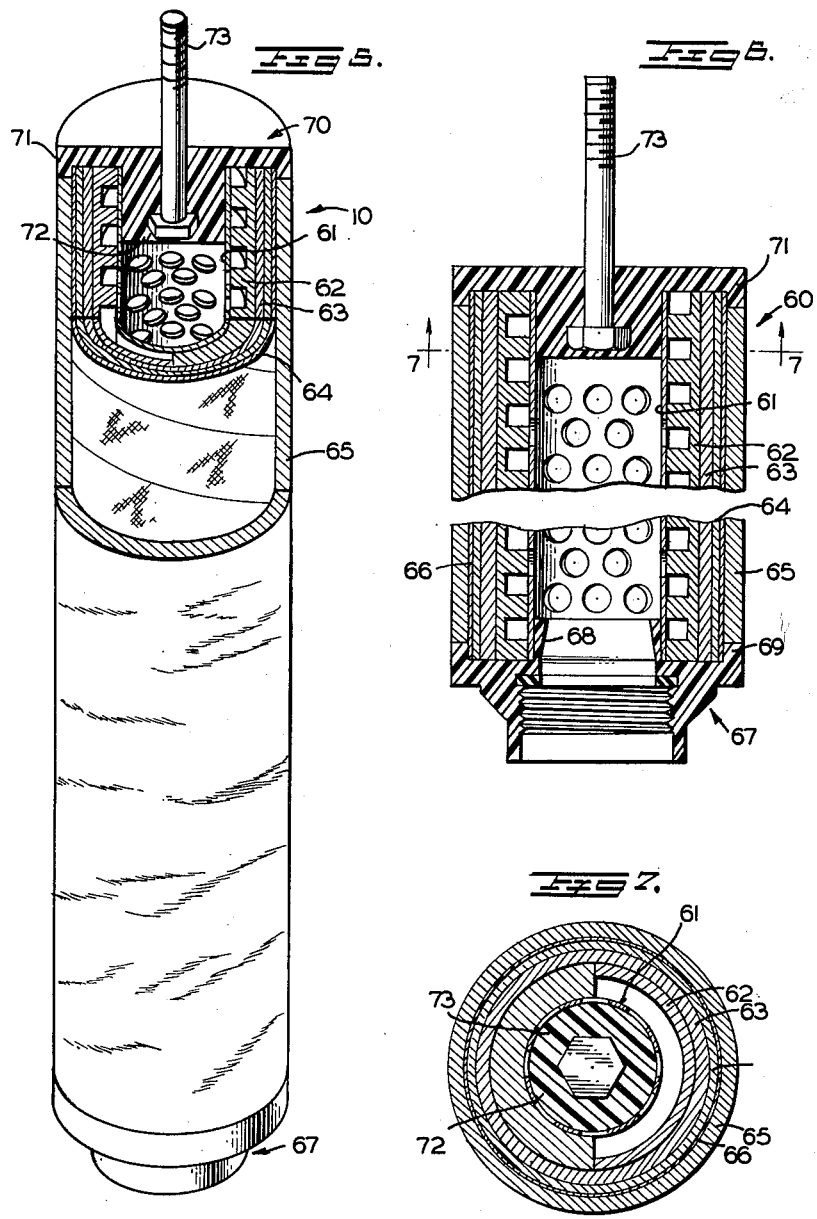
INVENTOR.
MAC C. CUTLER
BY *Stowell & Stowell*
ATTORNEYS

United States Patent Office 3,186,552
Patented June 1, 1965

3,186,552
FILTER ELEMENT END CAP
Mac C. Cutler, Los Gatos, Calif., assignor to Filters, Inc., San Jose, Calif., a corporation of California
Filed Dec. 12, 1962, Ser. No. 244,052
2 Claims. (Cl. 210—457)

The present invention relates to a filter and, more particularly, to a filter element which removes and coalesces water particles in the fluid passed therethrough.

Heretofore it has been common practice in the bulk filtration field in which contaminants and water particles must be removed from a fluid passed through a filter to provide a number of individual filter elements or cartridges in a vessel and to provide canisters or cages to secure the filter cartridges in a liquid-tight manner within the vessel so that the liquid flowing therethrough will not bypass the filter cartridges. The filter cartridges serve the purpose of removing dirt and contaminants from the liquid and to remove water from the main body of liquid as it passes through the vessel. The water is generally in an emulsified state and the filter cartridge separates the water particles by coalescing them into larger globules and droplets which separate by gravity from the main liquid stream so that the liquid discharged from the vessel is completely free of water. When the filter cartridges become sufficiently clogged with contaminants so that the pressure drop across them is excessive, they are removed from the vessel and replaced with new filter cartridges.

Difficulties encountered in the securing of the filter cartridges by individual canisters or cages in the filter or water separation housing have been numerous. The canisters have proved to be a source of primary leakage and also, since the canister is made of metal, will eventually tend to rust and therefore contaminate the effluent downstream from the filter cartridge. The canister has also added to the cost of the filtration equipment since a separate canister is required for each individual filter cartridge. Since the canister surrounds the filter cartridge and the cartridge is completely enclosed therein, the canister has taken up additional space in the vessel so that a large number of filter cartridges cannot be mounted therein in order to increase the filtration capacity or flow rate in gallons per minute for a vessel or housing of a given size or dimension. The troublesome jagged bottom edges of the metal canister and other sharp edges thereof also present the problem of inadvertently gouging or ripping the non-metal portions of the filter cartridge.

The requirement of a canister for each filter cartridge has further increased the maintenance cost since the canister must be disassembled first and then the filter cartridge removed from it which, of course, requires undue time and labor in merely replacing a dirty filter cartridge with a fresh filter cartridge. The mounting of the filter cartridge within the canister requires a greater number of individual component parts and, therefore, resulting in a filter cartridge leaking or being bypassed.

It is the object of the present invention to provide a filter cartridge for the separation of water from a liquid and removal of dirt contaminants therein that has plastic end seal means that are made in one simple molding operation.

It is another object of the present invention to provide a filter cartridge having plastic end cap sealing means for securing the filter cartridge within the filter vessel or housing and to eliminate the requirement of any auxiliary equipment to accomplish this result such as the canisters or perforated cages used heretofore.

It is another object of the present invention to provide a filter cartridge having plastic end cap means formed integral therewith for securing a gasket in place to seal the flow of foreign matter or fluid at the point where the filter cartridge fastens to the filter vessel nipple or adapter member.

It is another object of the present invention to provide a filter cartridge having plastic end cap means for applying the appropriate thread thereto for fastening the filter cartridge to the nipple or adapter member in the vessel or housing to secure it thereto.

It is another object of the present invention to provide a filter cartridge having integral gasket means in the plastic end cap means which form a seal preventing flow of foreign matter and fluid through the end of the filter cartridge.

Other objects and advantages of the present invention will be readily apparent from the following detailed description when considered in connection with the accompanying drawings forming a part thereof and in which:

FIG. 1 is a fragmentary perspective view of a filter vessel with an adapter member therein and a filter cartridge for securing to the adapter member;

FIG. 2 is a fragmentary side elevation partly in section, showing in exploded fashion the filter cartridge and the adapter or nipple member and the filter vessel to which it is secured;

FIG. 3 is a side elevation in section of the die member for forming the plastic end cap means for the filter cartridge embodied in the present invention;

FIG. 4 is another view showing the method of molding the plastic end cap means, the gasket seal, and forming threaded means in the plastic end cap means for securing the filter cartridge to the adapter member of the filter vessel or housing;

FIG. 5 is a perspective view partly is cross-section illustrating a modified structure;

FIG. 6 is an enlarged fragmentary cross-sectional view of the modified structure illustrated in FIG. 5; and FIG. 7 is a sectional view of the structure taken along line 7—7 of FIG. 6.

Referring to FIGS. 1, 2, 3, and 4, the reference numeral 10 generally designates a filter cartridge and water separator element consisting of an elongated annular member 11 made of resin-impregnated fiberglass material. A cylindrical center tube or core 12 having a plurality of apertures or perforations 13 therein is mounted within the central opening or bore of the cartridge 10. The opposite ends of the annular filter member and the center tube are coextensive and the metallic center tube is made of non-corrosive material. A shroud 14 made of knitted cotton material is mounted over the cartridge so as to prevent loosening or migration of the fiberglass particles downstream of the filter cartridge.

In making the filter cartridge with the element of the present invention, a metal die mold member as best shown in FIGS. 3 and 4 is used. The mold die 15 comprises a cylindrical member provided with a large cylindrical mold cavity 16 disposed centrally in the upper portion thereof. The cavity 16 is provided with a rounded or arcurate upper edge 17 and extends vertically downwardly at 18 and forms a cylindrical portion or configuration. The cavity then extends horizontally inwardly at 19 to form an annular shoulder in the cavity and thereafter extends vertically downwardly at 20 to form another cylindrical configuration or portion of a reduced or smaller diameter than portion 18. Thereafter, the cavity extends horizontally inwardly at 21 to form another annular shoulder in the cavity and then extends vertically downwardly at 22 providing another cylindrical configuration shorter than 18. The cavity thereafter tapers or extends diagonally downwardly and inwardly at 23 and terminates in a vertical lower end 24. The bottom 25 of the cavity is annular and has an upturned portion 26 forming an annular boss 27 therein.

A threaded die member 30 is disposed within the cavity 16. The die member 30 is substantially cylindrical and is provided with a tapered upper portion 31 adjacent portion 18 and extending out of and above the die member 15 a substantial distance. Central die member 30 has a substantially vertical cylindrical portion 32 adjacent the portions 20 and 22 of die member 15 and therebelow has an enlarged diameter at 33 to provide an annular seat 34 for receiving a ring gasket 35 preferably made of rubber material. The large cylindrical portion 33 of the threaded die member 30 is provided with a plurality of external threads 36 thereon and the lower end of 33 sets on the boss 27 of the die member 15. The lower end of the die member 30 is provided with a reduced cylindrical portion 37 which seats within the central bore of the boss 27. The die members are preferably made of a metal such as steel so that the plastic material, once it is hardened and set, can be unscrewed easily and removed from the die mold. Die member 30 is pressed fitted into the central bore of the boss 27 of die member 15, and the external threads 36 are disposed in vertical alignment with the outer surface of the boss 27 so that a plastic end cap may be formed on the filter cartridge of substantially annular shape.

After the fiberglass filter cartridge 10 has been formed and mounted on a perforated center tube by any well known means, the plastic end cap is formed thereon by filling the die mold as shown in FIG. 3 with a liquid resin material in a liquid state. The resin material is preferably made of a polyester resin although it may be made of other resins which have the property of being hard when cured and not soft, resilient and pliable when set. The rubber gasket 35 is first placed on seat 34 of the annular die member 30 as shown in FIG. 3 and thereafter cavity 16 is filled with the liquid resin. The filter cartridge and center tube is then mounted over 30 as shown and has its lower end submerged in the liquid resin material 40 until a portion of the resin material overlaps or extends above the lower inner and outer ends of the filter cartridge as indicated at 41 and 42 in FIG. 4.

The outside diameter of the filter cartridge is substantially the same as the inside diameter of the die mold adjacent the portion 18 thereof so that only a small portion of the liquid resin 40 is allowed to flow upwardly along the outer surface of the cartridge and the major portion of the upper portion of the resin will seal and bond to the fibrous material at the end of the filter cartridge. The inner diameter of the annular fiberglass member and the inside the diameter of the center tube is greater than the outer diameter of the tapered portion 31 and the cylindrical portion 32 of threaded die member 30 as shown in FIG. 4, so that the liquid resin material, as indicated at 41, will also form a seal on the inner vertical under side of the center tube 12 and the cartridge. The portions 24 and 25 of the die member 15 have a larger diameter than the inner diameter of the fiberglass material and center tube.

After the filter cartridge has its lower end immersed in the liquid resin filling the mold cavity of the die mold as described hereinbefore, the entire assembly is cured. The curing is done until the resinous material hardens and sets to form a hard and rigid end cap permanently secured to the center tube and fiberglass material. The curing of plastic end caps is done by any well known means.

The completed cured plastic end cap and the cartridge is removed from the die mold by merely unthreading the cartridge and the integral molded plastic end cap secured thereto from the die mold by hand or other suitable means.

Referring to FIG. 2, the molded plastic end cap generally indicated at 43 bonded to the fiberglass material and the perforated center tube consists of an annular horizontal flat portion 49 and an annular upwardly extending inner rim 45. A portion of the plastic material typically seeps upwardly about the lower portion of the outer surface of the fiberglass material to form an upwardly extending rim 44 having an outer diameter substantially equal to the outer diameter of the member 11. The portion of the end cap below 49 consists of a short vertical cylindrical portion 46, an inwardly inclined or tapered portion 47 extending downwardly therefrom which terminates in a vertical cylindrical portion 48.

The inner surface of the annular end cap 43 consists of a tapered portion 45 projecting into the center tube, a cylindrical portion 50 having substantially the same diameter as the inner diameter of the rubber ring gasket 35 and an enlarged internally threaded opening or portion 51 below which is a cylindrical opening or portion 52.

During the molding operation, the ring gasket 35 has its upper surface bonded to the lower surface of portion 49 of the end cap 43 and its outer side or surface bonded to portion 46 of the end cap with approximately ⅓ of the lower surface of the gasket covered and bonded by the plastic material so that the ring gasket is embedded in and forms an integral part of the plastic end cap and cannot come loose therefrom.

With respect to the plastic end cap on the upper end of the cartridge, it may typically be in the form of a solid circular member which completely seals and closes off the opposite end of the cartridge and is molded in the same way described for the lower end cap except it is of a different configuration. A modified form of the plastic end closures on the upper end is illustrated in FIGS. 5, 6, and 7 and will be explained in greater detail hereinafter.

Referring to FIGS. 1 and 2, the reference numeral 53 generally designates a vertical cylindrical filter vessel or housing in which a plurality of individual filter cartridges 10 are mounted. The bottom member 54 of the vessel is provided with a plurality of nipples or adapter members 55, only one of which is shown. The member 55 is provided with a cylindrical portion 56 adjacent the upper end thereof with external threads thereon adapted to receive the internal threads on end cap 43. Adapter member 55 is provided with a transverse spider 57 as shown in FIG. 1 through which a securing bolt 58 extends to rigidly secure the adapter member to the horizontal plate member 54 in a liquid tight relationship.

The filter cartridge 10 is secured within the vessel 53 in an operative position by threading the end cap 43 onto the threads 56 of the adapter nipple until the upper or top thread of the nipple butts against and seats against the lower surface of the ring gasket 35. Thereafter liquid is flowed through the filter cartridge by introducing liquid such as aviation gasoline or jet fuel into the vessel 53 by means not shown through the interior passage of the nipple 55, the liquid flowing through the end cap and up into the center tube and thereafter passing outwardly through the annular filter member to provide an inside-out filter cartridge. Dirt and contaminants in the stream of liquid passing through the filter cartridge will be caught by the filter cartridge material and the downstream side of the filter cartridge will permit only clean liquid to pass therefrom. Small water particles in the liquid will be coalesced into larger droplets in passing through the filter and will fall by gravity down the outer side of the cartridge to be removed at intervals from the vessel. When the accumulation of dirt and contaminants cause the pressure drop across the cartridge to increase beyond a predetermined value, the operation of the vessel is shut down and it is only necessary to unscrew or unthread and detach the filter cartridge from the nipple and to replace it with a clean filter cartridge.

Referring to FIGS. 5, 6, and 7, there is shown a filter cartridge of the type described and illustrated in United States Patent 3,061,107 entitled "Filter Cartridge and Method of Making Same," Lucian W. Taylor, having plastic end closures formed in accordance with the present invention. Reference numeral 60 generally designates a filter cartridge and water separator including an inner perforated cylindrical center tube or core 61, a plurality of coaxial superposed layers 62, 63, 64, and 65 of fibrous material. A screen wrap 66 is wrapped about the layer 64 and is disposed between layers 64 and 65.

The fiberglass filter cartridge 60 is formed in such a manner that the outermost layer 65 of the fibrous material is somewhat shorter than the other coaxially disposed layers, thereby leaving a portion of the opposite ends of the screen wrap material 66 exposed. The lower end of the filter cartridge is then placed in the die mold as shown in FIG. 3, and submerged in the liquid resin until a portion of the resin material overlaps or extends above the lower inner and outer ends of the filter cartridge, thereby forming an end cap structure generally indicated at 67 with an inner and an outer rim 68 and 69, respectively. The plastic material of the inner rim 68 upon curing forms a good mechanical bond with the inner perforated tube 61; while the plastic material of the outer rim 69 becomes intermeshed with the screen wrap 66 to form an excellent bond therewith as well as the lowermost portion of the outer wrap 65. It will be understood that the end cap 67 is in all other respects similar to the end cap 43 illustrated in FIGS. 1, 2, and 4.

The upper end cap structure, generally indicated at 70, is typically in the form of a solid circular member comprised of the same plastic material as used for the end cap structure at the lower end of the cartridge. The plastic material used to fabricate the upper end cap 70 forms an outer annular rim 71 and forms a mechanical bond with the exposed portion of the screen wrap 66; while the inner portion of the plastic forms an inwardly extending cylindrical section 72, the outer portion of which forms a bond with the adjacent portion of the inner perforated tube 61. The cylindrical section 72 also receives the head of a threaded fastener 73 which may be used to secure the upper end of the filter cartridge 60 within an associated filter tank in certain applications thereof.

Thus, the present invention provides a method of making a filter cartridge or element and a water separator element provided with plastic end cap structures that can be made in one simple molding operation with plastic end caps that simultaneously become an end seal integral with the fibrous media of the filter for sealing off the end of the filter cartridge and thereby eliminate any possibility of the by-pass flow of foreign matter and liquid through the end of the element; a means for integrating a gasket with the filter cartridge to form a seal for the filter cartridge in the vessel where the cartridge is attached to the vessel nipple or adapter; and means for applying the appropriate thread and forming it integral with the end cap for fastening it to the nipple.

Thus the present invention provides a filter cartridge and a water separator cartridge and a method of making the same which eliminates the need for auxiliary equipment such as a canister or a cage used heretofore in which the filter cartridge was enclosed in order to properly secure it within the filter vessel. It is apparent that the present invention therefore provides a filter cartridge for use in a filter vessel or housing which can be directly secured thereto and which has a minimum number of parts and requires a minimum time and effort for replacing it in order to keep the filtration apparatus in use.

According to the patent statutes, I have explained principles and mode of operation of my invention, and have illustrated and described what I now consider to represent its best embodiment. However, I desire to have it understood that, within the scope of the appended claims, the invention may be practiced otherwise than as specifically illustrated and described.

What is claimed is:

1. In a filter apparatus having:

a filter housing, a bottom plate member in said housing;

a nipple member having external threads and having one end secured to said bottom plate member and the other end extending inwardly into said housing providing a fluid inlet passage for said filter housing; and a hollow filter cartridge threadably secured to said nipple member, the improvement comprising said filter cartridge which includes a hollow cylindrical mass of resin impregnated fibrous material, a perforated center tube disposed within the hollow interior of said mass of fibrous material and being in contact and substantially coextensive therewith, first and second plastic end caps sealing off the opposite ends of said cylindrical mass of fibrous material and being intimately bonded to the respective ends of said mass of fibrous material and said perforated center tube, said first end cap having an annular portion the upper surface of which is intimately bonded to one end of said cylindrical mass of fibrous material and the respective end of said perforated center tube, said first end cap having an integral hollow cylindrical portion depending from said annular portion extending away from said mass of fibrous material, internal threads integrally formed on the inner surface of said hollow cylindrical portion for threaded engagement with the external threads of said nipple member, an annular gasket seat formed within the interior of said first end cap below the upper surface of said annular portion and adjacent the innermost portion of said internal threads said first end cap including an annular recess intermediate said gasket seat and said innermost portion of the threads, an annular ring gasket in contact with said gasket seat and secured thereto, a portion of said ring gasket being retainingly received in said annular recess, and said first end cap includes inner and outer spaced apart upwardly extending rims integrally formed on said annular portion, said rims being respectively in intimate contact with adjacent portions of the outer side of said hollow cylindrical mass of fibrous material and said perforated center tube.

2. In a filter apparatus having:

a filter housing, a plate member adjacent one end of said housing;

a nipple member having external threads and having one end secured to said plate member and the other end extending inwardly into said housing providing a fluid inlet passage for said filter housing; and a hollow filter cartridge threadably secured to said nipple member, the improvement comprising said filter cartridge which includes a hollow cylindrical mass of resin impregnated fibrous material, a perforated center tube disposed within the hollow interior of said mass of fibrous material and being in contact and substantially coextensive therewith, first and second plastic end caps sealing off the opposite ends of said cylindrical mass of fibrous material and being intimately bonded to the respective ends of said mass of fibrous material and said perforated center tube, said first end cap having an annular portion the upper surface of which is intimately bonded to one end of said cylindrical mass of fibrous material and the respective end of said perforated center tube, said first end cap having an integral hollow cylindrical portion depending from said annular portion extending away from said mass of fibrous material, internal threads integrally formed on the inner surface of said hollow cylindrical portion for threaded engagement with the external threads of said nipple member, an annular gasket seat formed within the interior of said first end cap below the upper surface of said annular portion and adjacent the innermost portion of said internal threads, an annular ring gasket in contact with said gasket seat and secured thereto, a portion of said ring gasket being retainingly disposed adjacent the innermost portion of the threads, and said first end cap includes inner and outer spaced apart upwardly extending rims integrally formed on said annular portion, said rims being respectively in intimate contact with adjacent portions of the outer side of said hollow cylindrical mass of fibrous material and said perforated center tube.

References Cited by the Examiner

UNITED STATES PATENTS

| | | | |
|---|---|---|---|
| 1,240,175 | 9/17 | Burke | 156—242 |
| 2,440,487 | 4/48 | Rayburn | 210—323 |
| 2,689,652 | 9/54 | Gretzinger | 210—457 |
| 2,800,232 | 7/57 | Marvel | 210—484 |
| 2,960,234 | 11/60 | Fredrickson | 210—457 |
| 3,032,462 | 5/62 | Saporito | 156—242 |

FOREIGN PATENTS

| | | |
|---|---|---|
| 826,325 | 1/60 | Great Britain. |
| 892,663 | 3/62 | Great Britain. |

REUBEN FRIEDMAN, *Primary Examiner.*

HARRY B. THORNTON, *Examiner.*